United States Patent [19]

Morse et al.

[11] 3,908,805

[45] Sept. 30, 1975

[54] ANTI-SKID CONTROL DEVICE AND SYSTEM

[75] Inventors: Walter H. Morse, South Windsor; Ira R. Ames, Jr., Salisbury, both of Conn.

[73] Assignee: The Jacobs Manufacturing Company, West Hartford, Conn.

[22] Filed: Jan. 9, 1974

[21] Appl. No.: 431,952

[52] U.S. Cl............................ 188/181 A; 303/21 F
[51] Int. Cl.............................................. B60t 8/16
[58] Field of Search... 188/181 A; 303/21 F, 21 CF, 303/21 CG

[56] References Cited
UNITED STATES PATENTS

| | | | |
|---|---|---|---|
| 2,573,386 | 10/1951 | Berkoben et al. | 188/181 A |
| 2,772,904 | 12/1956 | Doolittle | 188/181 A X |
| 2,964,048 | 12/1960 | Mortimer | 188/181 A X |
| 3,633,978 | 1/1972 | Remillieux | 303/21 F |
| 3,754,795 | 8/1973 | Von Lowis et al. | 303/21 F |

Primary Examiner—Duane A. Reger
Attorney, Agent, or Firm—Stephen J. Rudy

[57] ABSTRACT

A mechanical anti-wheel lock-up control system for avoiding wheel lock-up and consequent skidding in a motor vehicle, including a lock-up sensor or control device arranged in an open end of the axle tube and protectively covered over by the hub cap of the wheel, the control device being of an inertia flywheel actuable valve type controlling relief from and application of service air to the braking mechanism, the control device having an input shaft associated with the flywheel by means of an axially disengageable cam clutch and geared to be driven by the hub cap. The control device may be employed in a system individual to each wheel, or in a system serving a plurality or pair of wheels. In the latter, a control module of valves modulates the pressure of service air feeding to the braking mechanism in controlling a wheel lock-up condition.

19 Claims, 2 Drawing Figures

ANTI-SKID CONTROL DEVICE AND SYSTEM

BACKGROUND OF THE INVENTION

This invention is concerned with anti-wheel lock-up systems for controlling skidding of a motor vehicle equipped with air brakes.

Systems of this general nature are known from U.S. Pat. Nos. 3,046,060 and 3,447,838. In the first of these, a mechanical unit for sensing and controlling an imminent wheel lock-up condition is located partly within the brake drum of a related wheel whereby a crowded condition with the usual required elements therein is created. In the second of these patents, the sensing unit is located externally of the wheel where it is subject to the elements of weather and other hazards.

A general objective of the present invention is to improve upon these known systems by providing one having various features and advantages resulting therefrom which are not present in these known system.

A feature of the system of the present invention is a miniture mechanical sensing unit or control device for controlling an imminent wheel lock-up condition in a vehicle, which unit is removably mounted in an open end of the axle tube supporting a related wheel, and which unit is protectively covered over by the hub cap of the wheel.

A very desirable advantage of this sensing unit arises from its location in the axle tube behind the hub cap, where it is guarded against attack by foreign particles or elements of the weather, is readily accessible for repairs or replacement, and does not occupy space usually required for an adequate accommodation of other elements.

A feature of the sensing unit is the manner in which it is operatively asociated with the hub cap. This is of importance in that its arrangement does not require changes or modifications to be made in the brake drum of the related wheel, nor does it require components to be associated with the exterior of the wheel for its operation, as is required by the known devices mentioned.

Another feature of the present invention is a service air control module interconnecting a pair of sensing units with the braking mechanism of a pair of wheels for controlling the application to, and relief of service air from, the braking mechanisms when a wheel lock-up condition is imminent.

A desirable advantage of the module lies in its efficiency in controlling service air flow to the related braking mechanisms. It functions to maintain a minimum pressure of service air in the system in controlling an imminent wheel lock-up condition; it tends to lower system air pressure to match road conditions and aids in conserving air consumption. It further provides a plurality of cooperating valves in a single housing.

The foregoing, as well as other features, objectives, and advantages of this invention will appear more fully after considering the detailed description which follows in conjunction with the accompanying drawings wherein the invention is illustrated. It is to be expressly understood, however, that the drawings are for purposes of illustration and description, and accordingly they are not to be construed as defining the limits of the invention.

DESCRIPTION OF A FIRST SYSTEM EMBODYING THE INVENTION

Figure 1:
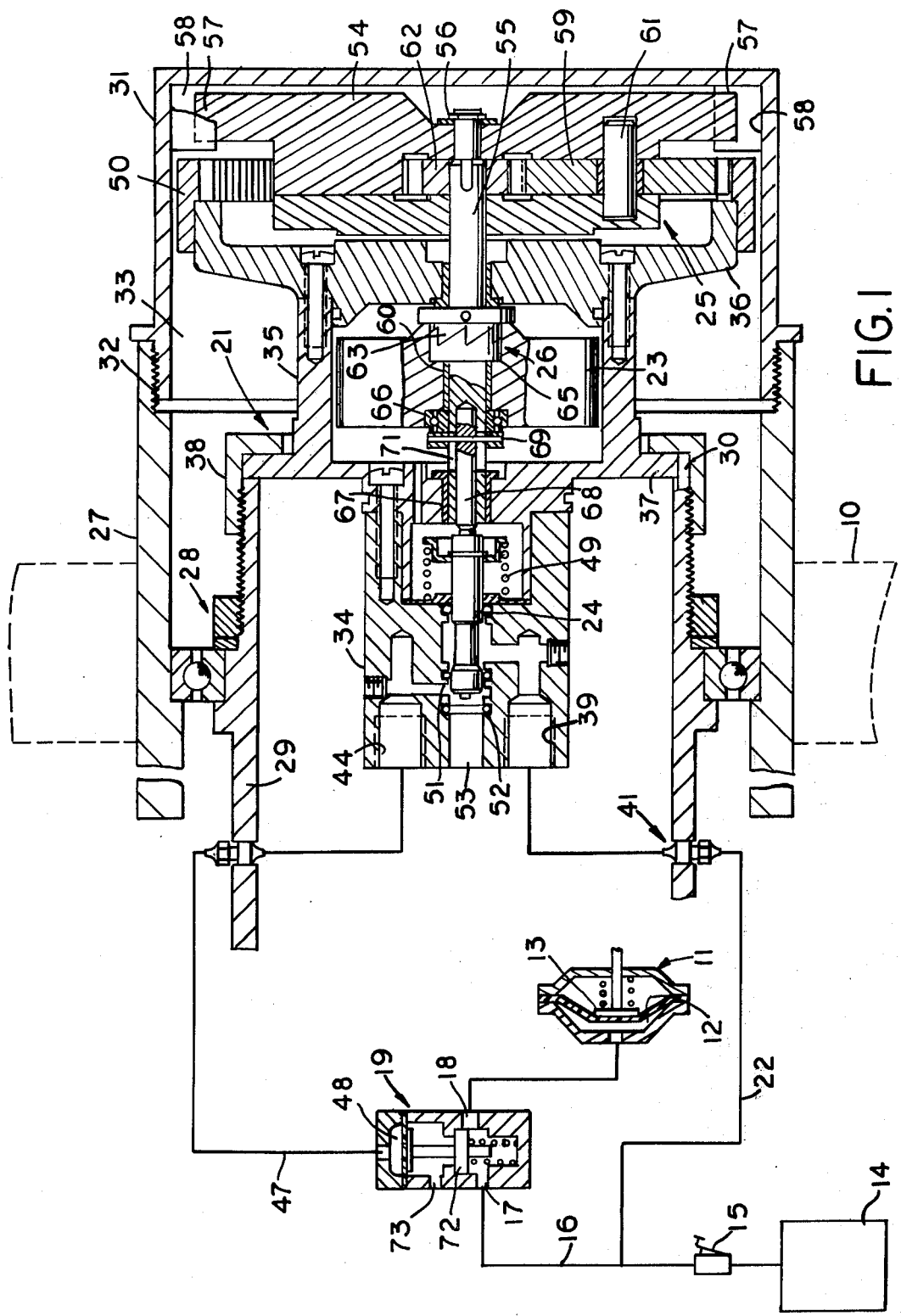
FIG. 1 is an illustration in schematic of a skid control system embodying the invention as applied to the braking mechanism of one of the wheels of a motor vehicle.

For a more detailed understanding of the invention, reference is directed to the drawings, but now especially to FIG. 1 wherein the invention is illustrated in a skid control system applied to an individual wheel 10 of a motor vehicle truck equipped with the usual air braking mechanism.

The braking mechanism includes the usual service air operable brake acutator 11 having a chamber 12 in which a diaphragm pilot 13 acts, when the chamber is pressurized, to cause application of the associated brakes in conventional manner to the wheel.

Flow of service air from the usual supply tank 14 is controlled by or subject to the will of the operator. For this purpose, a conventional pedal operable brake valve 15 is connected in the service air main line 16.

When the operator actuates the brake valve, service air flows over line 16 through normally communicating ports 17 and 18 of a service air relay 19 to pressurize the brake acutator 11, causing application of the usual associated brakes to the wheel 10. When the brake valve is released by the operator, the pressurized condition of the brake actuator is relieved back through the ports 17 and 18 and the service line 16 to the usual normally open vent in the brake valve. This is the action that occurs in a normal braking operation.

At other times, as when the wheel is rolling over a slippery road surface and the brakes are applied to it, the braking pressure may cause the wheel to rapidly decelerate relative to the velocity of the vehicle so as to make imminent a lock-up of the wheel with consequent skidding.

To avoid this occurrence, a wheel lock-up or skid sensing unit or control device 21 is associated with the wheel. It is connected downstream of the brake valve to a branch 22 of the service line. It functions automatically in response to development of an imminent lock-up condition in the wheel to control application to and relief of pressure air from the brake acutator 11, whereby the lock-up condition is avoided and the wheel is finally brought to a stop without undesirable skidding taking place.

The sensing unit or sensor 21 includes an inertia flywheel member 23 which has rotatable and axial movement relative to a slide valve 24, the latter being operable by the axial movement of the flywheel to control flow of service line air to the relay 19, Speed increasing planetary gearing 25 having a driven connection with the wheel 10, together with a cam tooth overriding clutch 26 functions to drive the flywheel.

The wheel 10 with which the sensor is operatively associated is mounted upon a hub 27 which is supported in conventional manner by suitable bearing and retaining means 28 on an axle tube 29 near an end of the latter. The axle tube is fixed in known manner to the chassis of the vehicle so as to be carried by the latter.

The axle tube is hollow and open at opposite ends. Each end of the axle tube is protectively covered over by a hub cap 31, the right end of the axle tube and the right hub cap being shown. The hub cap is threadedly connected at 32 to the mounting hub of the wheel. The hollow interior of the axle tube, together with a space or sealed chamber area 33 defined between the end of the axle tube and the hub cap, provides an ideal location for the sensor where it will be protectively sealed against foreign matter and where it will not interfere with other components of the vehicle.

To enable it to be accommodated in this advantageous but small area, the sensor has been miniaturized. It includes a group of sections 34, 35 and 36 which have been bolted to one another in end to end axial relation to define a housing for the sensor. The forward section 34 is of reduced diameter. It extends with a suitable clearance into the interior of the axle tube. The intermediate section 35 and the rear section 36, as well as the planetary gearing 25, are adequately accomodated in the chamber 33 provided by the interior of the hub cap.

The sensor is retained rigidly to the axle tube by means of a peripheral flange 37. The flange abuts the end wall of the axle tube and is rigidly clamped in position by means of a collar nut 38 threadedly engaging the axle tube. A key 30 engaged in registering slots of the flange and axle tube retains the sensor against rotation relative to the axle tube.

The sensor has an inlet passage 39 cooupled by a fitting 41 through a radial hole in the axle tube with the branch service line 22. The sensor also has an outlet passage 44 similarly coupled by a fitting 41 through a radial hole in the axle tube with a line 47 connected to the diaphragm pilot chamber 48 of the relay valve 19.

The sensor valve 24 has a normal position under the bias of a return spring 49 closed upon a seat 51. In this condition, connection of the service inlet line 22 with the sensor outlet line 47 to the relay pilot chamber is blocked, and line 47 is connected through an opposite seat 52 in the sensor with a vent 53.

Shuttling or shifting of a valve 24 back and forth between the seats 51 and 52 is controlled by the return spring 49 in conjunction with axial movements of the flywheel 23 in response to sudden deceleration and reacceleration actions of the wheel 10 during a braking action.

The flywheel is operatively associated with the wheel 10 through the hub cap 31. To this end, a planetary drive cage 54 is mounted upon a drive or input shaft 55 for relative rotation and is retained thereon against endwise escape by a retaining clip 56. The planetary cage is drivable splined or engaged with the hub cap be means of a pair of peripheral lugs 57 engaged with a slide fit in internal slots 58 of the hub cap.

The drive cage carries idler gears 59 on pins 61, which gears (one being shown) drivengly engage a sun gear 62 keyed to the drive shaft 55 and also engage a ring gear 50 fixed to housing section 36. Pinned upon the drive shaft is a drive clutch member 63 engaged by cam teeth with a driven clutch member 65. The latter is press fitted in a recess to the flywheel. Sleeve bearing 60 provides a slidable bearing support for the flywheel upon the shaft.

The shaft 55 extends beyond the flywheel and is supported at its free end for relative rotation in a bearing 67. A rod 68, slidably received in an axial recess of the shaft, carries a cross pin 69 which is extended through, and is axially movable in, a guide slot 71 formed in the shaft. The spring 49 which biases valve 24 upon the seat 51 also holds valve 24 constantly in abutment with the slide rod 68, pressing the latter into the shaft so that a slide collar carrying the cross pin 69 abuts the flywheel bearing 66.

In summary of the operation of the system: When the driver depresses the foot pedal to actuate the brake valve 15, service air flows over the main line 16 through the normally connected ports 17, 18 of the relay 19 to pressurize the pilot chamber 12 of the brake actuator 11 causing application of the brakes to the wheel 10. As long as the deceleration of the wheel and that of the vehicle are uniform, a normal braking action occurs to bring the wheel to a stop without accompanying skidding. In this normal braking action, the flywheel 23 remains engaged by the clutch 63, 65 with the drive shaft 55.

Now, if because slippery or bad road conditions occur, the pressure of the braking action on the wheel 10— while the brake valve is in actuated condition— should suddenly decelerate to create an imminent wheel lock-up condition, the sensor flywheel 23 will ride ahead of the drive shaft 55 and will be forced axially along the shaft in a clutch overriding action as the driven clutch member 65 is cammed axially out of engagement from the driving clutch member 63. The axially moving flywheel acts through the slide rod 68 to shift the valve 24 against the force of the return spring 49 from valve seat 51 to the opposed valve seat 52. This closes the vent 53 and connects the branch service line 22 with the sensor outlet line 47 to the diaphram pilot chamber 48 of the relay. A signal of service line air then flows over the connected lines to pressurize the pilot diaphram chamber to shift the relay valve 72 to an opposite position. The shifted valve blocks service air flow over main line 16 through the relay to the brake actuator 11, and causes the pressurized condition of the brake acutator to be relieved through the vent 73.

As the braking pressure is then relaxed, wheel 10 reaccelerates. Then, as the speed of the flywheel 23 and shaft 55 rematch, valve 24 and the flywheel are reshifted as a unit axially under the force of spring 49 to re-engage the clutch. If while the brake valve remains actuated, an imminent wheel lock-up condition continues, the action of the flywheel and shifting of the valve will be repeated. In effect, valve 24 will be rapidly oscillated from one condition by the shifting of the flywheel to the other until the wheel 10 is finally brought to a stop without accompanying skidding.

It is to be further noted here that the particular arrangement of the sensor 21 in the axle tube 29 and in the hub cap 31 has further advantages in that it allows ready access to the sensor for repair or replacement.

The ease with which the sensor 21 is adapted to be assembled to the axle tube 29 is another advantage. In this respect, after the hub cap 31 has been unscrewed from the hub 27 of the wheel, the forward reduced section 34 of the sensor is entered into the open end of the axle tube until the flange 37 abuts the end shoulder of the axle tube. The sensor is then adjustably rotated as needed to register the key 30 with its slot. The collar nut 38 is then drawn tight to clamp the sensor rigidly in place. The slots 58 in the hub cap 31 are then registered to particularly receive the lugs or splines 57 of the planenary drive cage 54. The lugs are then fully received into the slots as the hub cap is threadedly drawn tight upon the hub 27.

The system disclosed in FIG. 1 represents a simple embodiment of the invention in which a separate sensor unit or control device 21 and a relay 19 are individual to the braking mechanism of each wheel 10 to which the system is applied. it is understandable that when a separate sensor unit is associated with each end of the axle tube, the slope of the cam teeth of the clutch members 63, 65 of the sensor at one end of the axle tube will be inclined reversely to those of the other sensor to obtain the necessary overriding declutching action of the clutch.

FIG. 2 EMBODIMENT

Figure 2:
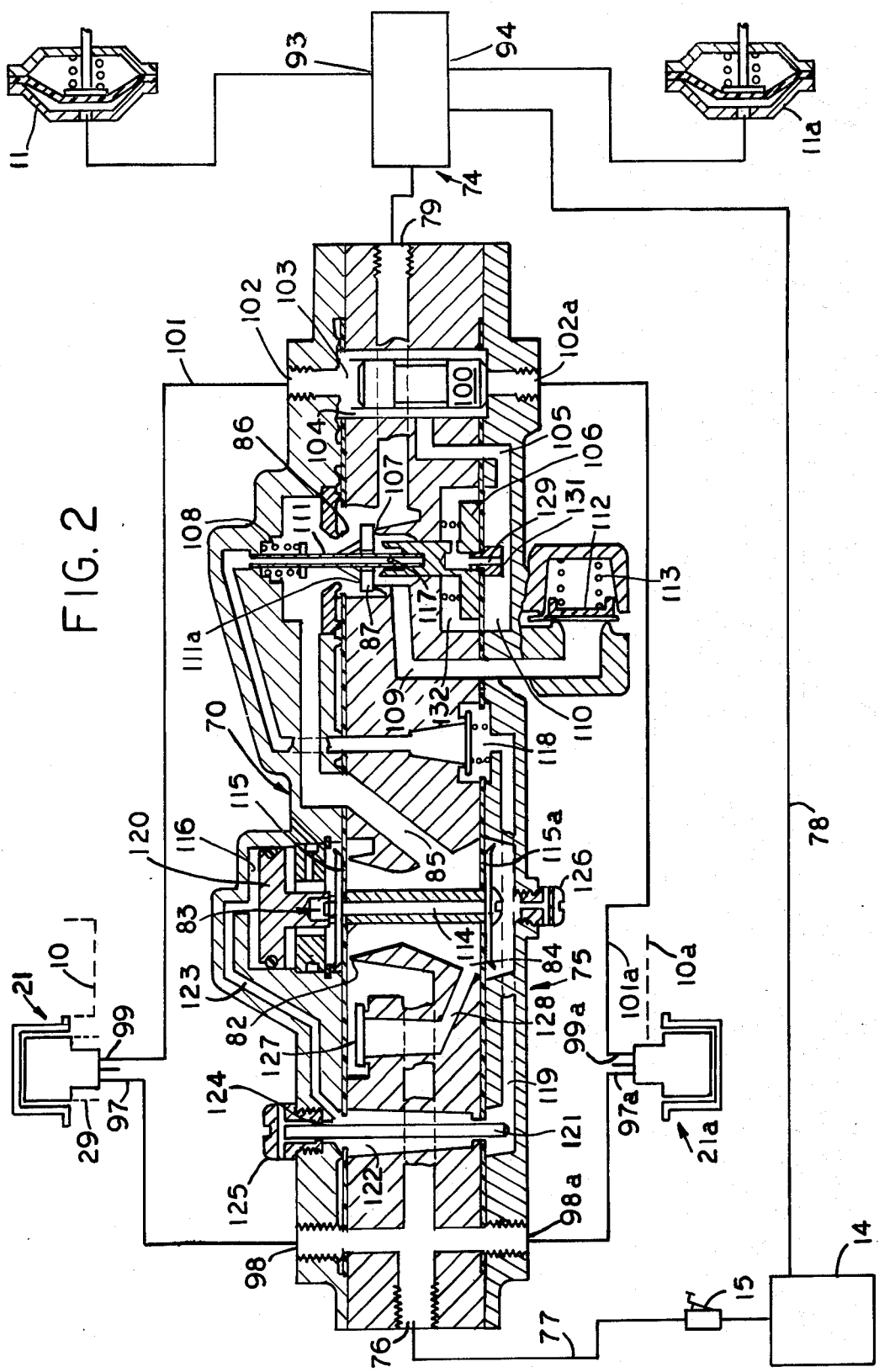
FIG. 2 is an illustration in schematic of a further skid control system embodying the invention in which a pair of skid sensing units together with the service air control module are integrated and applied to the braking mechanisms of a pair of wheels of the vehicle.

The system disclosed in FIG. 2 is shown as being applied to the braking mechanisms of the wheels 10 and 10a mounted to opposite ends of the axle tube 29 so as to avoid an imminent wheel lock-up condition in either wheel and consequent skidding. To this end, the system includes a pair of sensors or control devices 21 and 21a, one mounted (in the manner earlier described) to each end of the axle tube, the sensors being the same as that shown in FIG. 1 A conventional relay valve 74 is common to and serves the right and left brake acutators 11 and 11a for the braking mechanisms of both wheels, and module 75 of interconnected valves connected with both sensors controls application of service air to the one relay 74.

The module 75 includes a general housing 70 having an air inlet passage 76 connected to a branch 77 beyond the brake valve 15. The housing has an outlet passage 79 connected with the relay valve 74.

In a braking operation, the driver of the vehicle depresses the usual foot pedal to acutate the brake valve 15 causing service air from tank 14 to flow to the inlet passage 76 of the module. From the inlet, the air flows through a normally open seat 82 of a pressure reducing valve 83 into a chamber 84 of the latter. It passes from from the latter into a passage 85 from which it flows through a normally open seat 86 of a quick-acting valve 87 into the outlet passage 79 leading to a relay valve 74.

The service air from port 79 applied to the relay valve 74 cause air to be applied to the brake chambers 11, 11a in a conventional manner through lines 93 and 94. The relay valve 74 supply port 96 is connected with air line 78 which is feed from reservior 14.

Air then flows over the line 78 through the relay to pressurize both brake actuators, causing the related brakes to be applied to the right and left wheels 10 and 10a. Under normal road conditions, the wheels are decelerated in this action to a stop without accompanying skidding.

When the brake valve is subsequently released, the pressurized condition of the relay valve 74 is relaxed back through the passages of the module and through the usual vent in the brake valve 15. This interrupts the flow of air through line 78 and causes the relay valve to exhaust air from line 94 and 93 and from chambers 11 and 11a in a conventional manner. The braking action on the wheels is then relaxed as the diaphragms of the brake actuators are restored by their springs. This is the manner in which a normal braking action occurs in FIG. 2 system.

Now, if an immenent wheel lock-up condition should develop in one or both wheels 10, 10a while the associated brakes are being applied, one or the other or both sensors 21, 21a are adapted to respond to control the braking action of the wheels so as to avoid the lock-up condition and consequent skidding. To this end, the service air inlet 97 to the right wheel sensor 21 is connected with a passage 98 in the module branching off the main inlet passage 76; and the outlet 99 of the right wheel sensor is connected by a line 101 with a port 102 that opens into one end of a shuttle valve chamber 103 in the module. The inlet 97a to the left wheel sensor is similarly connected with a branch 98a of the inlet passage 76 of the module. and its outlet 99a is similarly connected by a line 101a with a port 102a opening into the opposite end of the shuttle valve chamber. The shuttle valve chamber 103 connects by grooves 104 in its wall with a passage 105 leading to the underside area of a diaphragm actuable piston 106. The latter controls shifting action of the quick-acting valve 87 relative to opposed seats 86 and 107.

The quick-acting valve is normally biased by a return spring 108 upon seat 107 so as to block outlet passage 79 in the module from a vent passage 109, and to connect it through the opposed open seat 86 with the passage 85.

When one or the other of the sensors in this FIG. 2 system responds to an imminent lock-up condition of its associated wheel during a braking operation, its valve is shifted by the related flywheel, as earlier explained with respect to FIG. 1, to connect the pilot and outlet ports 39, 44. This causes a signal of service air to flow to the corrsponding end of the shuttle valve chamber 103. The signal will (if received from only one of the sensors) shift the shuttle valve 100 closed over the opposite entry port if it is not already there so as to prevent the signal from being lost through the vent connected line of the other sensor. The signal will then flow through the grooves 104 of the chamber and the connecting passage 105 to pressurize the chamber 110 beneath the pilot piston 106.

If signals from both sensors enter the shuttle valve chamber, the shuttle valve will become pneumatically balanced between the ends of its chamber and allow both signals to pass to the chamber 110 beneath the pilot piston 106. Since the vents 53 in both sensors will be closed by the respective sensor valves in the latter situation, neither signal will be lost.

Upon being pressurized by the sensor signal, the pilot piston moves against an end of a hollow stem 111 loosely extending through the quick-acting valve 87. In this action, the stem is moved against the bias of its return spring 108 to allow the piston to shift the quick-acting valve closed onto the opposed seat 86 so as to interrupt flow of service air through the module to the pilot chamber of relay 74 and to connect the latter with the vent passage 109 through the module. With this action, the pressurized condition of the relay 74 is relaxed through port 79 to the vent passage 109 and past a minimum pressure check valve 112 to atomsphere.

The check valve 112 is designed to allow, according to the tension of its return spring 113, a predetermined minimum pressure to remain in the relay 74, which would be a little more than required to overcome the spring of brake actuators 11, 11a but not enough to effectively apply the brakes. This will be understood by those working in the art.

As the relay valve restores, the connected brake acutators 11, 11a also restore to relax the braking pressure being applied to the corresponging wheels, thus avoiding the threatened lock-up condition. The affected sensor also restores as the acceleration of the related wheel now increases, and the pressurized condition of the chamber 110 beneath the pilot piston 106 of the quick-acting valve is relieved back through the shuttle valve and connections through the related sensor to the sensor vent. This causes the spring 108 to reshift the quick-acting valve back over seat 107.

Since the brake pedal continues to be depressed and the wheels are still rolling, flow of service air through the module to pressurize the relay resumes and a braking action re-occurs. If a wheel lock-up condition continues to be sensed, the affected wheel sensor responds as before. The resumption of braking action and interruption of such action continutes repeatedly. In this action, the affected sensor valve rapidly oscillates from one condition to the other as a wheel lock-up condition is alternately dissipated and reinstated. The oscillation ends as the vehicle is finally braked to a stop.

The minimum pressure check valve 112 is of advantage in that it functions to maintain a minimum pressure to the relay 74 during the period a sensor is functioning to avoid a lock-up condition. This arrangement is of particular advantage in that it conserves air that would otherwise be wasted were the brake actuator to be repeatedly completely emptied and refilled during a braking action. It accordingly also promotes swift action in applying the brakes.

The pressure reducing valve 83 is incorporated into the module to reduce the maximum service line air pressure passing to the relay 74 after the initial response of a sensor, so that during the repeated action of the sensor to control an imminent wheel lock-up condition, the maximum pressure of the service air passing to the relay will be limited at the brake actuators. This acts to throttle the air to brake actuators which allows the brakes to respond more quickly to the sensor signals.

The pressure reducing valve 83 is of a floating spool diaphram actuable type. It includes a stem 114 extending freely through its chamber 84 and suspended therein by means of diaphragms 115, 115a fastened one to each end of the stem and sandwiched in the housing of the module. A piston 120 in the chamber 116 above the diaphragm end 115 provides a surface area that is subject to biasing pressures developing in chamber 116 to restrict the valve seat opening 82 and thereby reduce the pressure of service air passing from the inlet passage 76 through the valve chamber 84 to the passage 85 leading eventually through the outlet passage 79 to the relay 74.

Chamber 116 is supplied with biasing pressure air when the quick-acting valve 87 has been transferred from seat 107 to seat 86 by movement of piston 106. Movement of piston 106 carries stem 111 opening seat 111a. When the latter action occurs, air in passage 85 passes around stem 111 in valve 87 and enters a radial port 117 to the hollow stem 111 and escapes through a check valve 118 to a passage 119 that bleeds around a loosely fitting end of a pin 121 to an accumulating chamber 122. The lattter connects at its opposite end by a passage 123 with chamber 116. The biasing air pressure develops in the latter chamber to the extent permitted by bleed clearance 124 in plug 125. Vents 124 in plug 125 connect with passage 123. The area below the opposite diaphragm 115a is also provided with a bleed plug 126 to maintain this area vented.

It can be seen that the pressure developing in chamber 116 over the end of the pressure reducing valve will be progressive according to the duration of the "on-and-off" braking action that is required to finally bring an affected wheel to a stop without incurring a wheel lock-up condition.

It is understandable that after the operator releases the brake valve 15, the pressure of air in the system will be relieved through the various vents.

Further, after the brake valve is released, a quick-acting venting valve 127 seated over a passage 128 connected to the pressure reducing valve chamber 84 functions to rapidly relieve pressure air from the module system back through the inlet passage 76 to the usual vent in the brake valve. Passage 128 by-passes the restricted seat opening 82 of the pressure reducing valve. The quick-venting valve functions only when the brake valve 15 is released since at other times it is pneumatically unbalanced in a closed condition over the by-pass 128.

As earlier mentioned, when a sensor responds to an imminent wheel lock-up condition, its valve is shifted and a service line pressure air signal is fed to the shuttle valve chamber of the module to cause the quick-acting valve 87 to interrupt service line air flow to the relay 74 and thereby cause the braking action on the wheels to be relaxed. It is understandable that if the valve of a responding sensor (FIG. 1) were to be stuck for some reason in its shifted open position, normal braking action would be disabled. To avoid this results, means is provided which will in such event cause the quick-acting valve 87 to reopen the service air flow passage 76, 85, 79 through the module to the relay 74 to maintain normal braking action.

This means includes a bleed hole 129 provided through a bleed screw 131 in the pilot piston. The bleed hole connects the chamber 110 at the underside of the diaphragm piston 106 with a chamber 132 at the upper side. By this means, air pressure building up at the upper side 132 together with the supplemental aid of the return spring 108 will force the quick-acting valve 87 to its normal position over seat 107 allowing feed of service air to the relay to be received for normal braking operations. During normal conditions, as when a valve in a sensor is not stuck in an open condition, the shifting of the quick-acting valve 87 from one valve seat to the other in avoiding a wheel lock-up condition is so rapid that any bleed air escaping to the upper chamber 132 is quickly vented back through the shuttle valve chamber and the vent of the affected sensor.

While an embodiment of the invention has been illustrated and described in detail herein, it is to be expressly understood that the invention is not limited thereto. Various changes can be made in the design and arrangement of the parts of the embodiment without departing from the spirit and scope of the invention as the same will now be understood by those skilled in the art; it is our intent, therefore, to claim the invention not only as shown and described herein but also in all such forms and modifications as may reasonably be construed to fall within the spirit of the invention and the scope of the appended claims.

What is claimed is:

1. A motor vehicle including an axle tube having a wheel hub mounted thereon for relative rotation and having an open end; a hub cap covering over the open end of the axle tube and secured to the wheel hub for rotation with the latter, the hub cap defining an interior chamber adjacent the open end of the axle tube; an anti-wheel lock-up control device disposed in part in the open end of the axle tube and projecting in part into the chamber provided by the hub cap; retaining means detachably coupling the control device to the axle tube, the control device having an input drive shaft; means drivingly engaging the hub cap with the input drive shaft; a wheel mounted upon the wheel hub; a source of service air; a brake valve selectively operable for feeding the service air to a main line; a brake actuator having a pressure pilot chamber subject to reception of service air for applying braking torque to the wheel; a service air relay having an inlet connection with the main line, an outlet connection with the pilot chamber of the brake actuator, and a vent to atmosphere; a pressure air operable pilot valve in the relay normally communicating the inlet and outlet and blocking the outlet from the vent; the control device having a supply inlet connected to a branch of the main line, an air signal outlet connected for conducting an air signal to pressurize the pilot valve in the relay, and a signal vent to atmosphere; a control valve in the control device shiftable from a normal position communicating the signal outlet to the signal vent to a reserve position sealing the signal vent and communicating the supply inlet with the signal outlet, and inertia flywheel means in the control device having response to rapid decelerating and accelerating actions of the wheel controlling shifting of the control valve.

2. A motor vehicle as in claim 1, wherein a second anti-wheel lock-up control device is similarly associated with the opposite end of the axle tube and the related hub cap.

3. A motor vehicle as in claim 1, wherein the control device includes a peripheral flange disposed in abutting relation to the end of the axle tube, and the retaining means is a collar nut collaring the flange and threadedly engaging the axle tube.

4. A motor vehicle as in claim 1, including air operable brake actuating means for braking rotation of the wheel hub, an air operable relay having a connection with an air service line for conducting operating air to the brake actuating means, and valve means in the control device having response to rapid deceleration of the wheel hub to interrupt feeding of operating air by the relay to the brake acutating means.

5. A motor vehicle as in claim 1, wherein planetary gearing drivingly engages the input shaft, and means drivingly engages the hub cap with the gearing.

6. A motor vehicle as in claim 3, wherein the hub cap has a plurality of internal longitudinally extending slots and planetary gearing has a drive cage formed with lugs slidably received into the slots.

7. A motor vehicle as in claim 1, including brake actuating means for applying braking torque to the wheel hub, service air brake valve means selectively operable to feed service operating air to the brake actuating means; and means in the control device having response to rapid deceleration of the input shaft to interrupt feed of service operating air to the brake actuating means, and having response to predetermined reacceleration of the input drive shaft to restore feed of service operating air to the brake actuating means.

8. A motor vehicle as in claim 7, including a control module valve means connected between the control device and the brake actuating means for throttling and as a consequence limiting service air pressure to the brake actuating means.

9. An anti-wheel lock-up control unit for use in combination with a vehicle having an axle tube open in an end thereof, a wheel hub rotatably supported upon the axle tube, and a hub cap removably attachable to the hub in axial extension thereof for providing an interior chamber adjacent the open end of the axle tube, the control unit comprising a housing having a reduced forward section adapted to be slidably entered into the open end of the axle tube and having an enlarged rear section adapted to project from the axle tube for reception into the chamber of the hub cap, a clamping collar supported upon the housing for detachably clamping the control unit in position to the axle tube, an input shaft rotatably supported in the housing, and drive means supported upon the shaft including a driven member having lugs adapted for obtaining an axially slidable splined driven connection with the interior of the hub cap for transmitting rotation of the hub through the hub cap to the shaft, the control unit after having been combined with the axle tube and hub cap being slidably removable as a unit from the axle tube following removal of the hub cap and the collar.

10. An anti-wheel lock-up control unit as in claim 9, wherein the drive member has rotation relative to the shaft and drivingly engages planetary gearing having a sun gear keyed to the shaft whereby rotation of the drive member is transmitted to the shaft.

11. An anti-wheel lock-up control unit as in claim 10, wherein a flywheel has a bearing support upon the shaft for relative rotation and relative axial movement, and a cam toothed disengagable clutch engages the flywheel with the shaft for rotation with the shaft in an engaged condition of the clutch, and slide valve means controlling communication of an air inlet port with an outlet port is operatively connected with the flywheel.

12. An anti-wheel lock-up control unit as in claim 11, wherein the clutch includes a driving member pinned to the shaft, and a driven member unitary with the flywheel, the driving member having cam teeth engaging complementary teeth of the driven member.

13. An anti-wheel lock-up control unit as in claim 12, wherein the driven clutch member is responsive to sudden deceleration of the driving clutch member to be cammed axially out of engagement from the driving member and to carry the flywheel with it.

14. An anti-skid wheel lock-up control unit as in claim 13, wherein spring means normally biases the driven clutch member axially into engagement with driving clutch member.

15. An anti-wheel lock-up control unit as in claim 14, wherein the spring means also biases the valve means axially into constant abutting relation with the flywheel.

16. An anti-wheel lock-up control unit as in claim 15, wherein the valve means has a normal position in the engaged condition of the clutch in which the air inlet port is blocked from the outlet port and the outlet port is connected with a vent port.

17. An anti-wheel lock-up control unit as in claim 16, wherein the valve means has an axially shifted position in a disengaged condition of the clutch in which position the valve means seals the vent port and communicates the inlet port with the outlet port.

18. An anti-wheel lock-up control device for controlling lock-up in a wheel of a motor vehicle having air operable braking mechanism, comprising an input drive shaft carrying a pinion adapted to have a driven connection with the wheel, flywheel means having a bearing support on the shaft for relative rotation and axial movement, axially disengageable cam toothed clutch means including a driven member carried by the flywheel means normally engaging a driving member carried by the shaft, valve means abutting the flywheel means shiftable from a normal condition blocking communication of an air service inlet with an outlet connectible to the braking mechanism to a reverse condition communicating the inlet with the outlet, and spring means constantly biasing the valve means into abutment with the flywheel means and normally maintaining the clutch means engaged, the driven clutch member being disengageable to shift the flywheel means and as a consequence the valve means axially from its normal condition to its reverse condition as a consequence of a sudden deceleration of the driving clutch member.

19. An anti-wheel lock-up control device for controlling lock-up in a wheel of a motor vehicle having air operable braking mechanism, comprising an input drive shaft carrying a pinion adapted to have a driven connection, flywheel means having a bearing support on the shaft for relative rotation and axial movement, axially disengageable cam toothed clutch means including a driven member carried by the flywheel means normally engaging a driving member carried by the shaft, valve means abutting the flywheel means shiftable from a normal condition blocking communication of an air service inlet with an outlet connectible to the braking mechanism to a reverse condition communicating the inlet with the outlet, and spring means constantly biasing the valve means into abutment with the flywheel means and normally maintaining the clutch means engaged, the driven clutch member being disengageable to shift the flywheel means and as a consequence valve means axially from its normal condition to its reverse condition as a consequence of a sudden deceleration of the driving clutch member.

* * * * *